(12) United States Patent
Imabori

(10) Patent No.: US 12,087,972 B2
(45) Date of Patent: *Sep. 10, 2024

(54) SEALED BATTERY

(71) Applicant: TOYOTA JIDOSHA KABUSHIKI KAISHA, Toyota (JP)

(72) Inventor: Toshiki Imabori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,108

(22) Filed: Jun. 19, 2023

(65) Prior Publication Data
US 2023/0335869 A1    Oct. 19, 2023

Related U.S. Application Data

(63) Continuation of application No. 17/023,717, filed on Sep. 17, 2020, now Pat. No. 11,728,550.

(30) Foreign Application Priority Data

Oct. 1, 2019 (JP) .................................. 2019-181376

(51) Int. Cl.
*H01M 50/543* (2021.01)
*H01M 50/172* (2021.01)
*H01M 50/531* (2021.01)

(52) U.S. Cl.
CPC ....... *H01M 50/543* (2021.01); *H01M 50/172* (2021.01); *H01M 50/531* (2021.01)

(58) Field of Classification Search
CPC . H01M 50/543; H01M 50/531; H01M 50/172
(Continued)

(56) References Cited

U.S. PATENT DOCUMENTS 11,728,550 B2 *   8/2023  Imabori ............. H01M 50/505
                                                                 429/179
2019/0189995 A1   6/2019  Nemoto et al.
2019/0221791 A1 * 7/2019  Wakimoto ............ H01M 50/50

FOREIGN PATENT DOCUMENTS

JP    2014211967 A    11/2014
JP    2018081860 A    5/2018
(Continued)

*Primary Examiner* — Matthew T Martin
*Assistant Examiner* — Paul Christian St Wyrough
(74) *Attorney, Agent, or Firm* — Dickinson Wright, PLLC

(57) ABSTRACT

The present disclosure enables a decline in a joining force between an internal terminal and an external terminal to be suppressed even when a load is applied to a sealed battery from the outside. In a sealed battery disclosed herein, an external terminal includes a plate portion and a flange portion. The plate portion has a rectangular shape and includes an internal terminal joining portion that is joined to the internal terminal at one end of the plate portion in a lengthwise direction and an external device joining portion that is joined to an external device at another end of the plate portion in the lengthwise direction. The flange portion is arranged in at least one side edge portion of the plate portion in a transverse direction so as to rise approximately perpendicularly with respect to the plate portion. A first imaginary line which passes through a nearest point of the internal terminal joining portion to the external device joining portion and which is parallel to the transverse direction of the plate portion intersects with the flange portion.

5 Claims, 5 Drawing Sheets

(58) Field of Classification Search
USPC .......................................................... 429/179
See application file for complete search history.

(56) References Cited

FOREIGN PATENT DOCUMENTS

| | | |
|---|---|---|
| JP | 2019109972 A | 7/2019 |
| JP | 2019125491 A | 7/2019 |

* cited by examiner

SEALED BATTERY

CROSS REFERENCE TO RELATED APPLICATIONS

The present application is a continuation of U.S. patent application Ser. No. 17/023,717, filed Sep. 17, 2020, which claims the benefit of foreign priority to Japanese Patent Application No. 2019-181376 filed Oct. 1, 2019, which is herein incorporated by reference in its entirety.

BACKGROUND

1. Technical Field

The present disclosure is related to a sealed battery.

2. Description of the Related Art

Nonaqueous electrolyte secondary batteries such as lithium ion secondary batteries are growing in importance as vehicle-mounted power supplies and as power supplies for personal computers, mobile phones, and the like. In particular, lithium ion secondary batteries being lightweight and capable of attaining high energy density can be used as high-output vehicle-mounted power supplies.

A secondary battery of this type is constructed as, for example, a sealed battery in which an electrode body and a nonaqueous electrolyte are housed inside a battery case and the battery case is sealed. The sealed battery includes an internal terminal which is connected to the electrode body inside the battery case and of which a part is exposed to outside of the battery case and an external terminal which is connected outside of the battery case to the internal terminal. Japanese Patent Application Publication No. 2018-081860 discloses a sealed battery in which an internal terminal and an external terminal are fixed by swaging and electrically connected to each other. When constructing an assembled battery which includes the sealed battery in plurality as unit cells, external terminals of unit cells arranged adjacent to each other are connected via a busbar.

SUMMARY

However, in recent years, there is a growing demand for endurance and battery performance with respect to sealed batteries. An external terminal of the sealed battery has an external device joining portion to be joined with an external device such as a busbar, and stress may be generated by a load that is applied to the sealed battery from the external device via the external device joining portion. The stress may propagate to an internal terminal joining portion that is a joining portion between an internal terminal and the external terminal and may cause a joining force between the internal terminal and the external terminal to decline. A decline in the joining force between the internal terminal and the external terminal may increase electrical resistance of the internal terminal joining portion in accordance with a decrease in a contact surface area between the internal terminal and the external terminal and may result in an increase in electrical resistance.

The present disclosure has been made in consideration of the above and a main object thereof is to provide a sealed battery capable of suppressing a decline in a joining force between an internal terminal and an external terminal even when a load is applied to the sealed battery from the outside.

A sealed battery disclosed herein comprises: an electrode body including a positive electrode and a negative electrode; a battery case housing the electrode body; internal terminals which are individually connected to the positive electrode or the negative electrode of the electrode body housed in the battery case, and are partially exposed to outside of the battery case; and external terminals which are connected to the respective internal terminals outside the battery case. At least one of the external terminals electrically connected to the positive electrode and the external terminals electrically connected to the negative electrode includes a plate portion and a flange portion. The plate portion has a rectangular shape. And, the plate portion includes an internal terminal joining portion formed at one end of the plate portion in a lengthwise direction, that is joined to a corresponding internal terminal, and an external device joining portion formed at another end of the plate portion in the lengthwise direction, that is joined to an external device. The flange portion is arranged in at least one side edge portion of the plate portion in a transverse direction, the flange portion rises approximately perpendicularly with respect to the plate portion. A first imaginary line which passes through a nearest point of the internal terminal joining portion to the external device joining portion and which is parallel to the transverse direction of the plate portion intersects with the flange portion.

According to such a configuration, a sealed battery capable of suppressing a decline in a joining force between the internal terminal and the external terminal is provided.

In addition, in one aspect of the sealed battery disclosed herein, a second imaginary line which passes through a farthest point of the internal terminal joining portion to the external device joining portion and which is parallel to the transverse direction of the plate portion intersects with the flange portion, and the flange portion continuously exists between a first intersection of the first imaginary line and the flange portion and a second intersection of the second imaginary line and the flange portion.

According to such a configuration, a sealed battery capable of further suppressing a decline in a joining force between the internal terminal and the external terminal is provided.

Furthermore, in another aspect of the sealed battery disclosed herein, the flange portion is arranged in both side edge portions of the plate portion in the transverse direction.

Even according to such a configuration, a sealed battery capable of further suppressing a decline in a joining force between the internal terminal and the external terminal is provided.

In addition, in another aspect of the sealed battery disclosed herein, each of the external terminals has a flat plate shape.

According to such a configuration, even when using an external terminal with a flat plate shape in which stress caused by a load from the outside is readily transmitted to the internal terminal joining portion, a sealed battery capable of suppressing a decline in a joining force between the internal terminal and the external terminal is provided.

Furthermore, in another aspect of the sealed battery disclosed herein, on at least one of the positive electrode side and the negative electrode side, a corresponding internal terminal of the internal terminals and a corresponding external terminal of the external terminals are constituted of different types of metal materials.

According to such a configuration, a sealed battery capable of suppressing a decline in a joining force between different types of metal materials which may generally be weaker than a joining force of a junction between the same type of metal materials is provided.

In addition, in another aspect of the sealed battery disclosed herein, one of the internal terminals is constituted of a metal material of which a main component is copper, and the corresponding external terminal is constituted of a metal material of which a main component is aluminum.

According to such a configuration, a sealed battery capable of suppressing a decline in a joining force between copper and aluminum which may generally be weaker than a joining force of a junction between copper and copper or aluminum and aluminum is provided.

In addition, in another aspect of the sealed battery disclosed herein, each of the internal terminals includes a shaft portion which penetrates a corresponding external terminal of the external terminals and which is exposed to the outside of the battery case. A swaged portion that has been swaged so as to extend along an outer surface of the corresponding external terminal is formed at an end of the shaft portion on an exterior side of the battery case, and the internal terminal joining portion is formed along an outer peripheral edge portion of the swaged portion.

According to such a configuration, even when the internal terminal joining portion is formed along the outer peripheral edge portion of the swaged portion, a sealed battery capable of preferably suppressing a decline in a joining force between the internal terminal and the external terminal is provided.

DETAILED DESCRIPTION

Figure 1:
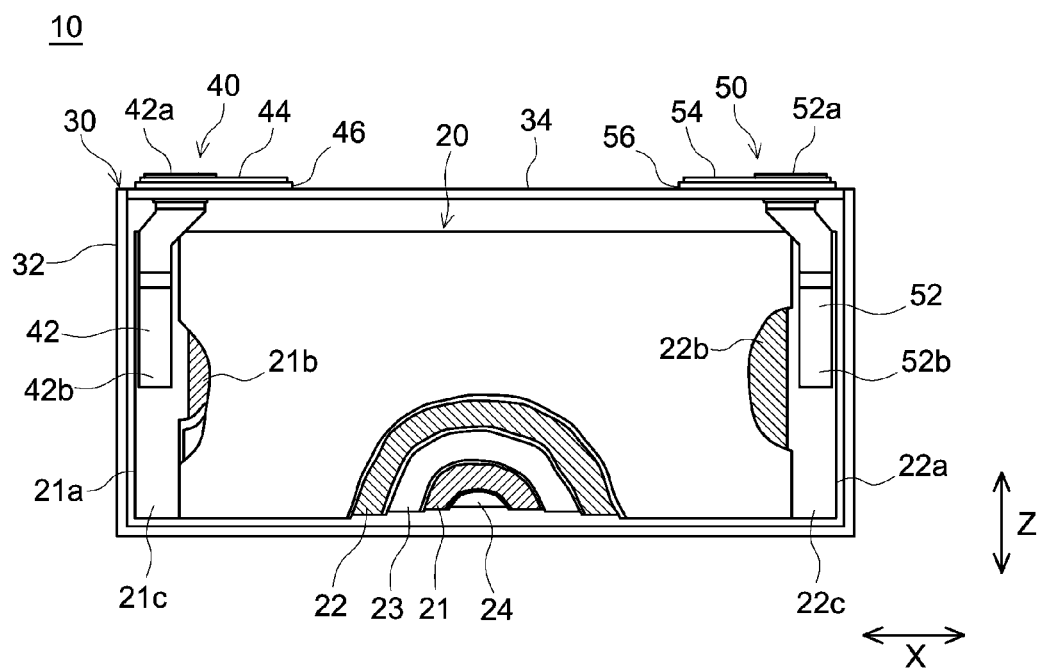
FIG. 1 is a partial sectional view of a sealed battery according to an embodiment of the present disclosure.

An embodiment of the present disclosure will be described below. It should be noted that, in the following drawings, members and portions that produce the same effects will be described using the same reference characters. It should also be noted that dimensional relationships (a length, a width, a thickness, and the like) shown in the respective drawings do not reflect actual dimensional relationships. Matters required to carry out the present disclosure, with the exception of matters specifically mentioned in the present specification, may be understood to be design matters of a person with ordinary skill in the art based on the prior art in the relevant technical field.

Sealed Battery

Figure 2:
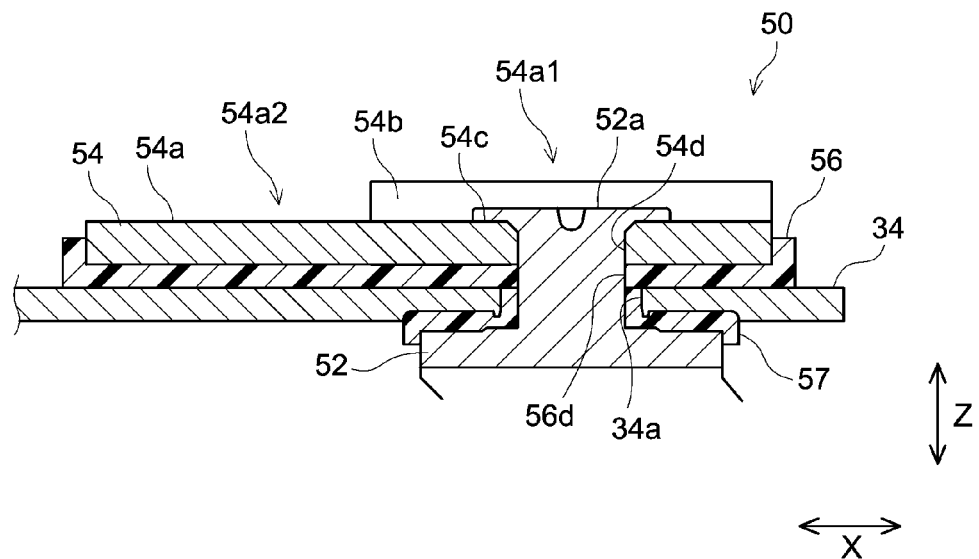
FIG. 2 is a sectional view showing an enlargement of a vicinity of the negative electrode external terminal shown in FIG. 1.
Figure 3:
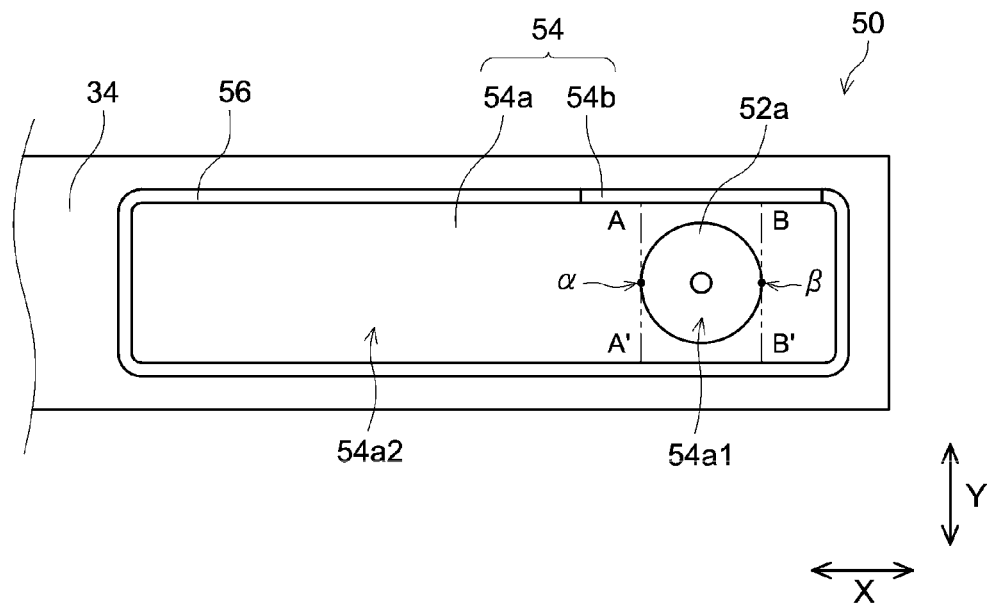
FIG. 3 is a top view showing an enlargement of a vicinity of the negative electrode external terminal shown in FIG. 1.
Figure 4:
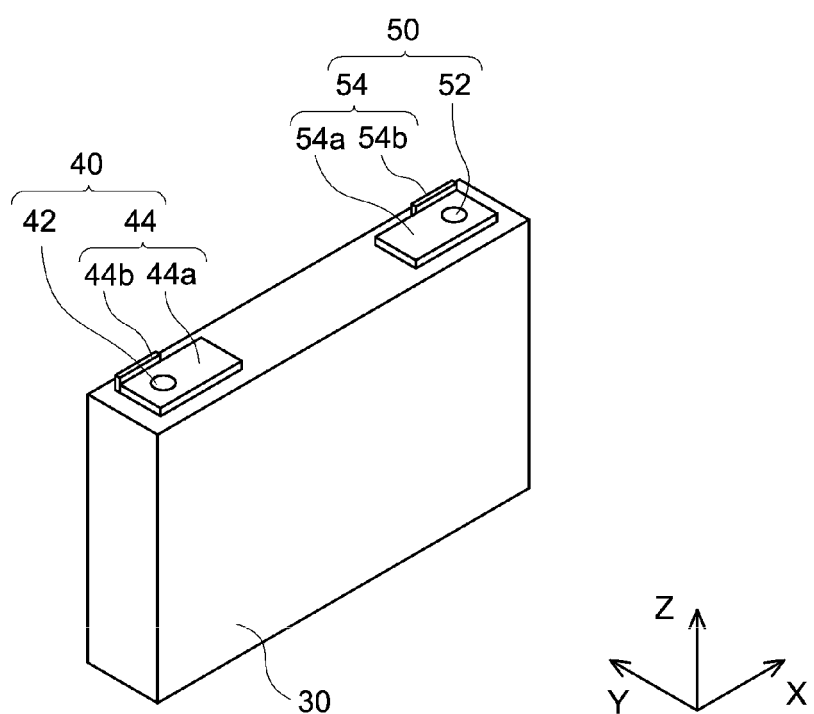
FIG. 4 is a perspective view schematically showing the sealed battery according to an embodiment of the present disclosure.
Figure 5:
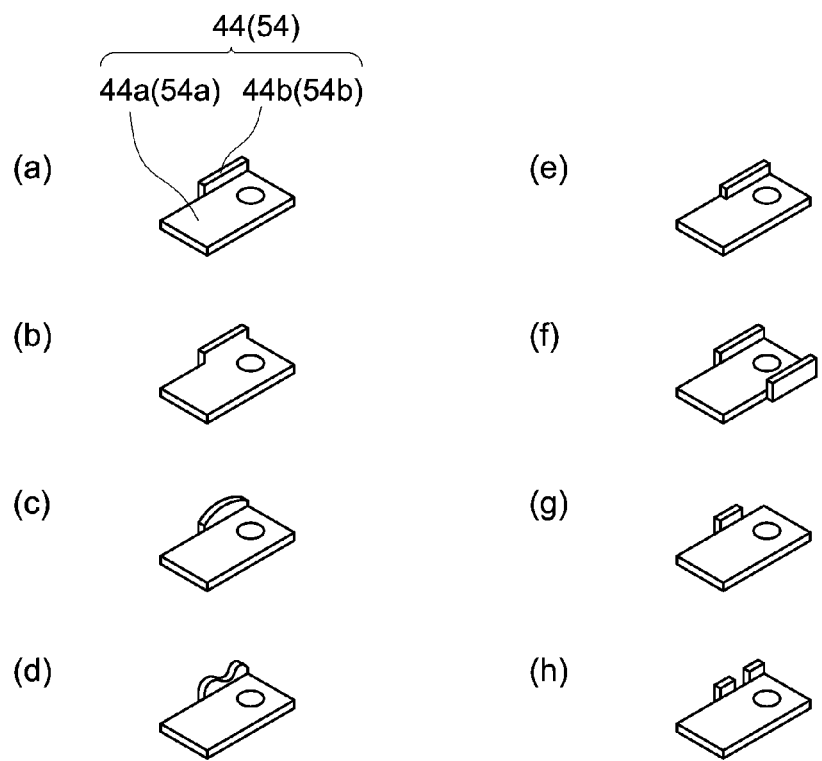
FIG. 5 is perspective view schematically showing various examples of modes of a flange portion in an external terminal according to an embodiment of the present disclosure.

FIG. 1 is a partial sectional view of a rectangular box-shaped (square) sealed battery according to the present embodiment. In addition, FIG. 2 is a sectional view showing an enlargement of a vicinity of a negative electrode terminal shown in FIG. 1. FIG. 3 is a top view showing an enlargement of a vicinity of the negative electrode terminal shown in FIG. 1. In addition, FIG. 4 is a perspective view schematically showing the sealed battery according to the present embodiment. Furthermore, FIG. 5 is perspective view schematically showing an external terminal according to the present embodiment. In the drawings of the present specification, a reference character X denotes a width direction (of a battery), a reference character Y denotes a thickness direction, and a reference character Z denotes a height direction. It should be noted that such directions are directions determined for the sake of illustration and are not intended to limit modes of installation of batteries.

As shown in FIG. 1, a sealed battery 10 according to the present embodiment includes an electrode body 20, a battery case 30, a positive electrode terminal 40, and a negative electrode terminal 50. Hereinafter, a structure of each element will be described.

(1) Electrode Body

The electrode body 20 is a power generation element housed inside the battery case 30 in a state of being covered by an insulating film (not illustrated) or the like. The electrode body 20 according to the present embodiment includes an elongated sheet-shaped positive electrode 21, an elongated sheet-shaped negative electrode 22, and elongated sheet-shaped separators 23 and 24. The electrode body 20 is a wound electrode body in which the elongated sheet-shaped members described above are wound in layers. It should be noted that the structure of the electrode body is not particularly limited and various structures that may be adopted in a general sealed battery can be adopted. For example, the electrode body may be a laminated electrode body in which a positive electrode and a negative electrode with rectangular sheet shapes are laminated via a separator.

The positive electrode 21 includes a foil-shaped positive electrode current collector 21a (for example, aluminum foil) and a positive electrode active material layer 21b formed on a surface (for example, both surfaces) of the positive electrode current collector 21a. In addition, in one side edge portion (a left-side side edge portion in FIG. 1) of the positive electrode 21 in the width direction X, the positive electrode active material layer 21b is not formed but a positive electrode connecting portion 21c is formed in which the positive electrode current collector 21a is exposed. The positive electrode active material layer 21b includes various materials such as a positive electrode active material, a binder, and a conductive material. Regarding the materials included in the positive electrode active material layer 21b, materials that may be used in a conventional general secondary battery (for example, a lithium ion secondary battery) can be used without any particular limitations, and since the materials included in the positive electrode active material layer 21b do not limit the present disclosure, a detailed description will be omitted.

The negative electrode 22 includes a foil-shaped negative electrode current collector 22a (for example, copper foil) and a negative electrode active material layer 22b formed on a surface (for example, both surfaces) of the negative electrode current collector 22a. In addition, in another side edge portion (a right-side side edge portion in FIG. 1) of the negative electrode 22 in the width direction X, the negative electrode active material layer 22b is not formed but a negative electrode connecting portion 22c is formed in which the negative electrode current collector 22a is exposed. In a similar manner to the positive electrode active material layer 21b, the negative electrode active material layer 22b also includes various materials such as a negative electrode active material, a binder, and the like. Regarding the materials included in the negative electrode active material layer 22b, materials that may be used in a conventional general secondary battery can be similarly used without any particular limitations, and since the materials included in the negative electrode active material layer 22b do not limit the present disclosure, a detailed description will be omitted.

The separators 23 and 24 are interposed between the positive electrode 21 and the negative electrode 22 and prevent the electrodes from coming into direct contact with each other. Although not illustrated, micropores are formed in plurality in the separators 23 and 24, and a configuration is adopted in which lithium ions move between the positive electrode 21 and the negative electrode 22 through these micropores. While a resin sheet or the like having required heat resistance is used as the separators 23 and 24, since a separator that may be used in a conventional general secondary battery can be used as the separators 23 and 24 without any particular limitations, a detailed description will be omitted.

(2) Battery Case

The battery case 30 is a container which houses the electrode body 20. The battery case 30 according to the present embodiment is a flat square container and includes a square case main body 32 of which an upper surface is opened and a plate-shaped lid 34 which closes an opening portion of the case main body 32. A metal material (such as aluminum, an aluminum alloy, or the like) having required strength may be used as the battery case 30.

(3) Electrode Terminal

The sealed battery 10 according to the present embodiment includes a positive electrode-side electrode terminal (the positive electrode terminal 40) connected to the positive electrode 21 of the electrode body 20 and a negative electrode-side electrode terminal (the negative electrode terminal 50) connected to the negative electrode 22 of the electrode body 20. Note that, in this specification, the "positive electrode-side" means "electrically connected to positive electrode of the electrode body". Meanwhile, the "negative electrode-side" means "electrically connected to negative electrode of the electrode body".

The positive electrode terminal 40 includes a positive electrode-side internal terminal (a positive electrode internal terminal 42) and a positive electrode-side external terminal (a positive electrode external terminal 44). The positive electrode internal terminal 42 is an elongated metal member that extends in the height direction Z. A lower end 42b of the positive electrode internal terminal 42 is connected inside the battery case 30 to the positive electrode 21 (specifically, the positive electrode connecting portion 21c). On the other hand, an upper end 42a of the positive electrode internal terminal 42 penetrates the lid 34 and is exposed to the outside of the battery case 30. In addition, while details will be provided later, the positive electrode external terminal 44 is connected outside the battery case 30 to the upper end 42a of the positive electrode internal terminal 42. In addition, in the positive electrode terminal 40 according to the present embodiment, in order to prevent conduction between the battery case 30 (the lid 34) and the positive electrode external terminal 44, an insulated holder 46 is arranged between the lid 34 and the positive electrode external terminal 44.

In the sealed battery 10 according to the present embodiment, both the positive electrode internal terminal 42 and the positive electrode external terminal 44 are constituted of metal materials having aluminum as a main component. As described above, the positive electrode internal terminal 42 and the positive electrode external terminal 44 according to the present embodiment are constituted of the same metal material (the same type of metal materials). But, the constitution of the positive electrode internal terminal and the positive electrode external terminal are not particularly limited. That is, the positive electrode internal terminal 42 and the positive electrode external terminal 44 may be constituted of different metal materials (different types of metal materials). Regarding metal materials, conventionally known metal materials that may be used in the positive electrode internal terminal 42 and the positive electrode external terminal 44 can be used without any particular limitations.

The negative electrode terminal 50 has a structure that is approximately the same as that of the positive electrode terminal 40 described above. Specifically, the negative electrode terminal 50 includes a negative electrode-side internal terminal (a negative electrode internal terminal 52) and a negative electrode-side external terminal (a negative electrode external terminal 54). The negative electrode internal terminal 52 is an elongated metal member that extends in the height direction Z. A lower end 52b of the negative electrode internal terminal 52 is connected inside the battery case 30 to the negative electrode 22 (specifically, the negative electrode connecting portion 22c). On the other hand, an upper end 52a of the negative electrode internal terminal 52 penetrates the lid 34 and is exposed to the outside of the battery case 30. In addition, while details will be provided later, the negative electrode external terminal 54 is connected outside the battery case 30 to the upper end 52a of the negative electrode internal terminal 52. Furthermore, an insulated holder 56 is arranged between the lid 34 and the negative electrode external terminal 54.

Unlike the positive electrode terminal 40 described above, in the negative electrode terminal 50 according to the present embodiment, the negative electrode internal terminal 52 is constituted of a metal material having copper as a main component and the negative electrode external terminal 54 is constituted of a metal material having aluminum as a main component. As described above, the negative electrode internal terminal 52 and the negative electrode external terminal 54 according to the present embodiment are constituted of different metal materials (different types of metal materials). But, the constitution of the negative electrode internal terminal and the negative electrode external terminal are not particularly limited. That is, the negative electrode internal terminal 52 and the negative electrode external terminal 54 may be constituted of the same metal material (the same type of metal materials). Regarding metal materials, conventionally known metal materials that may be used in the negative electrode internal terminal 52 and the negative electrode external terminal 54 can be used without any particular limitations.

In the sealed battery 10 according to the present embodiment, at least one of the positive electrode external terminal 44 and the negative electrode external terminal 54 has a plate portion and a flange portion. The plate portion has a rectangular shape. The plate portion includes an internal terminal joining portion and an external device joining portion. The internal terminal joining portion is formed at one end of the plate portion in a lengthwise direction, and is joined to a corresponding internal terminal. Also, the external device joining portion is formed at another end of the plate portion in the lengthwise direction, and is joined to an external device. Meanwhile, the flange portion is arranged in at least one side edge portion of the plate portion in a transverse direction. And, the flange portion rises approximately perpendicularly with respect to the plate portion. In addition, a first imaginary line which passes through a nearest point of the internal terminal joining portion to the external device joining portion and which is parallel to the transverse direction of the plate portion intersects with the flange portion.

The external terminal will be described below with specificity using the negative electrode external terminal 54 as an example. But a similar description will apply to the positive electrode external terminal 44. In the following description, a structure of an external terminal will be mainly illustrated and described using the negative electrode external terminal 54 as an example. But, when a similar description of a structure of the positive electrode external terminal 44 is given without illustration, it will be readily understood by those skilled in the art that the positive electrode external terminal 44 has a similar structure to the negative electrode external terminal 54 shown in FIGS. 2 and 3.

As shown in FIGS. 2 and 3, the negative electrode external terminal 54 has a plate portion 54a and a flange portion 54b. The plate portion 54a has a flat plate shape which is rectangular and which extends along a lengthwise direction (a width direction X). It should be noted that the plate portion 54a is not limited to having a flat plate shape and may have, for example, a shape having steps with different heights in a height direction Z in the lengthwise direction (the width direction X) as disclosed in FIG. 2 of Japanese Patent Application Publication No. 2019-36412. The plate portion 54a includes an internal terminal joining portion 54a1 that is joined to the negative electrode internal terminal 52 at one end in the lengthwise direction. In addition, the plate portion 54a has an external device joining portion 54a2 that is joined to an external device such as a busbar by bolt fastening, laser welding, or the like at another end in the lengthwise direction. A terminal insertion hole 34a into which the upper end 52a of the negative electrode internal terminal 52 is to be inserted is formed in the lid 34. A gasket 57 is mounted to the terminal insertion hole 34a of the lid 34. In addition, a terminal insertion hole 54d is also formed at one end of the negative electrode external terminal 54, and a terminal insertion hole 56d is also formed at one end of the insulated holder 56. The insulated holder 56 and the negative electrode external terminal 54 are arranged on an upper surface of the lid 34 so that the terminal insertion holes of the members overlap with each other.

Furthermore, the upper end 52a of the negative electrode internal terminal 52 is inserted into the terminal insertion holes of the respective members having been arranged so as to overlap with each other. And, a portion of the upper end 52a of the negative electrode exposed to the outside of the battery case 30 (an upper surface 54c of the negative electrode external terminal 54) is pressed and deformed into a disk shape to form a swaged portion 52a. The internal terminal joining portion 54a1 is formed along an outer peripheral edge portion of the disk-shaped swaged portion 52a. Accordingly, the negative electrode internal terminal 52, the negative electrode external terminal 54, and the insulated holder 56 are fixed to the lid 34. A boundary portion between the swaged portion 52a and the outside of the battery case 30 (the upper surface 54c of the negative electrode external terminal 54) may be welded by laser welding or the like. Accordingly, the negative electrode internal terminal 52, the negative electrode external terminal 54, and the insulated holder 56 are to be more rigidly fixed to the lid 34.

The flange portion 54b is arranged in a side edge portion of the plate portion 54a in a transverse direction so as to rise approximately perpendicularly with respect to the plate portion 54a. In addition, the flange portion 54b is formed so as to intersect (a first intersection A) with a first imaginary line (A-A') which passes through a nearest point u of the internal terminal joining portion 54a1 to the external device joining portion 54a2 and which is parallel to a transverse direction of the plate portion 54a. Furthermore, the flange portion 54b is formed so as to intersect (a second intersection B) with a second imaginary line (B-B') which passes through a farthest point R of the internal terminal joining portion 54a1 to the external device joining portion 54a2 and which is parallel to the transverse direction of the plate portion 54a. Moreover, the flange portion 54b may continuously exist between the first intersection A and the second intersection B.

FIG. 4 is a perspective view schematically showing a sealed battery according to the present embodiment. In the present embodiment, both the positive electrode external terminal 44 and the negative electrode external terminal 54 include plate portions 44a and 54a and flange portions 44b and 54b which have the characteristics described above. However, the sealed battery disclosed herein is not limited to such a mode. For example, only the positive electrode external terminal may include a plate portion and a flange portion or only the negative electrode external terminal may include a plate portion and a flange portion.

In addition, in the present embodiment, the flange portion 44b of the positive electrode external terminal 44 and the flange portion 54b of the negative electrode external terminal 54 are respectively provided in the side edge portion of the plate portion 44a and the side edge portion of the plate portion 54a on the same side in the transverse direction. However, the sealed battery disclosed herein is not limited to such a mode. For example, the flange portion of the positive electrode external terminal and the flange portion of the negative electrode external terminal may be provided in side edge portions on opposite sides.

FIG. 5 is perspective view schematically showing various examples of modes of a flange portion in an external terminal disclosed herein. The external terminals 44 and 54 shown in (a) of FIG. 5 represent same structures as the positive electrode external terminal 44 and the negative electrode external terminal 54 shown in FIG. 4. In the external terminals 44 and 54, the plate portions 44a and 54a and the flange portions 44b and 54b may be constituted of different members as shown in (a) of FIG. 5 or constituted of the same member as shown in (b) of FIG. 5. When the plate portions 44a and 54a and the flange portions 44b and 54b are constituted of different members, the flange portions 44b and 54b are not limited to being made of the same metal material as the plate portions 44a and 54a and may be made of a metal material that differs from the plate portions 44a and 54a or may be made of a ceramic material or the like. The plate portions 44a and 54a and the flange portions 44b and 54b may be joined to each other by an adhesive, welding, or the like. When the plate portions 44a and 54a and the flange portions 44b and 54b are constituted of the same member, the flange portions 44b and 54b may be molded by bending of the plate portions 44a and 54a.

In addition, the external terminals 44 and 54 are not limited to the flange portions 44b and 54b having a rectangular parallelopiped shape such as that shown in (a) of FIG. 5 and a cross-sectional shape of the plate portions 44a and 54a in the transverse direction may be a semicircular shape, an approximate M-shape, or the like as shown in (c) and (d) of FIG. 5.

Furthermore, the external terminals 44 and 54 are not limited to the flange portions 44b and 54b being provided on an outer surface in a ZX plane of the plate portion as shown in (a) of FIG. 5 and the flange portions 44b and 54b may be provided on an outer surface in an XY plane of the plate portions 44a and 54a as shown in (e) of FIG. 5.

Moreover, the external terminals 44 and 54 are not limited to the first imaginary line (A-A' (synonymous with A-A' in FIG. 3, a similar description applies hereinafter)) and the second imaginary line (B-B' (synonymous with B-B' in FIG. 3, a similar description applies hereinafter)) intersecting the flange portions 44b and 54b and the flange portions 44b and 54b continuously existing between the first intersection A and the second intersection B, and only the first imaginary line (A-A') may intersect with the flange portions 44b and 54b as shown in FIGS. 5G and 5H or the flange portions 44b and 54b may discontinuously exist between the first intersection A and the second intersection B.

It should be noted that lengths of the flange portions 44b and 54b in the X direction are not particularly limited as long as the first imaginary line (A-A') along the plate portions 44a and 54a in the transverse direction intersects (a first intersection A) with the flange portion 54b. However, from the perspective of suppressing deformations of the plate portions 44a and 54a, the lengths of the flange portions 44b and 54b in the X direction in lengths of the plate portions 44a and 54a in the lengthwise direction (long side length) can be set to equal to or longer than ⅛ and equal to or longer than ¼. And, the lengths of the flange portions 44b and 54b in the long side lengths of the plate portions 44a and 54a can be set to equal to or shorter than 1/1 and equal to or shorter than ¾.

Lengths of the flange portions 44b and 54b in the Y direction are not particularly limited. However, from the perspective of suppressing deformations of the plate portions 44a and 54a, the lengths of the flange portions 44b and 54b in the Y direction in lengths of the plate portions 44a and 54a in the transverse direction (short side length) can be set to equal to or longer than 1/20 and equal to or longer than 1/10. From the perspective of an entire size of the sealed battery 10, the lengths of the flange portions 44b and 54b in the short side lengths of the plate portions 44a and 54a can be set to equal to or shorter than ½ and equal to or shorter than ¼.

In addition, lengths of the flange portions 44b and 54b in the Z direction are also not particularly limited. However, from the perspective of suppressing deformations of the plate portions 44a and 54a, the lengths of the flange portions 44b and 54b in the Z direction in lengths of the plate portions 44a and 54a in a thickness direction (thickness) can be set to equal to or longer than one time and equal to or longer than 1.5 times. From the perspective of the entire size of the sealed battery 10, the lengths of the flange portions 44b and 54b in the Z direction in the thicknesses of the plate portions 44a and 54a can be set to equal to or shorter than 5 times and equal to or shorter than 3 times.

According to the sealed battery 10 configured as described above, a decline in a joining force between the internal terminal and the external terminal can be suppressed. The reason therefor is as follows.

As described above, since an external terminal is joined with an external device such as a busbar via an external device joining portion, stress may be generated by a load (mainly in the height direction Z) that is applied to the sealed battery from the external device. The stress may propagate to an internal terminal joining portion that is a joining portion between an internal terminal and the external terminal and may cause a joining force of the internal terminal joining portion to decline. A decline in the joining force of the internal terminal joining portion may increase electrical resistance of the internal terminal joining portion in accordance with a decrease in a contact surface area between the internal terminal and the external terminal and may result in an increase in electrical resistance.

However, in the present embodiment, a flange portion is arranged in at least one side edge portion of a plate portion in a transverse direction so as to rise approximately perpendicularly with respect to the plate portion, and the flange portion is formed such that a first imaginary line which passes through a nearest point of an internal terminal joining portion to an external device joining portion and which is parallel to the transverse direction of the plate portion intersects with the flange portion. In other words, in a lengthwise direction of the plate portion, the flange portion exists at a location that is nearer to the external device joining portion than to the internal terminal joining portion. To give a specific description using FIG. 3 as an example, in the X direction, a left end of the flange portion is positioned on a left side (a side nearer to the external device joining portion) than a left end of the internal terminal joining portion. By satisfying such a configuration, even when a load is applied to the sealed battery from the external device, the flange portion suppresses a deformation of the plate portion and propagation of stress to the internal terminal joining portion that accompanies the deformation is suppressed. As a result, a decline in a joining force between the internal terminal and the external terminal can be suppressed.

In addition, as shown in FIGS. 5A to 5F, a second imaginary line which passes through a farthest point of the internal terminal joining portion to the external device joining portion and which is parallel to the transverse direction of the plate portion intersects with the flange portion, and the flange portion continuously exists between a first intersection of the first imaginary line and the flange portion and a second intersection of the second imaginary line and the flange portion. Accordingly, a deformation of the plate portion can be further suppressed and a decline in the joining force between the internal terminal and the external terminal can be further suppressed.

In addition, as shown in (f) of FIG. 5, even by arranging the flange portion in both side edge portions of the plate portion in the transverse direction, a deformation of the plate portion can be further suppressed and a decline in the joining force between the internal terminal and the external terminal can be further suppressed.

Furthermore, even when the external terminal has a flat plate shape in which stress due to a load from the outside is readily transmitted to the internal terminal joining portion, a deformation of the plate portion can be suppressed and a decline in the joining force between the internal terminal and the external terminal can be suppressed.

In addition, even when the internal terminal and the external terminal are constituted of different types of metal materials on at least one of the positive electrode side and the negative electrode side, a deformation of the plate portion can be suppressed. As a result, a decline in a joining force between different types of metal materials which generally may be weaker than a joining force of a junction between the same type of metal materials can be suppressed.

Furthermore, even when the internal terminal is constituted of a metal material having copper as a main component and the external terminal is constituted of a metal material having aluminum as a main component, a deformation of the plate portion can be suppressed. As a result, a decline in a joining force between copper and aluminum which may generally be weaker than a joining force of a junction between copper and copper or aluminum and aluminum can be suppressed.

Furthermore, even when the internal terminal has a shaft portion which penetrates the external terminal and which is exposed to the outside of the battery case, a swaged portion that has been swaged so as to extend along an outer surface of the external terminal is formed at an end of the shaft portion on an exterior side of the battery case, and the internal terminal joining portion is formed along an outer peripheral edge portion of the swaged portion, a decline in the joining force between the internal terminal and the external terminal can be suppressed.

Simulation

In order to confirm that an external terminal according to the present embodiment is capable of suppressing a decline in a joining force between an internal terminal and the external terminal, a simulation was performed with respect to a rectangular box-shaped sealed battery shown in FIG. 4 in which a load was applied from an external device joining portion to an internal terminal joining portion. An overview of the sealed battery used in the simulation is as follows.

Internal terminal: a metal having copper as a main component
External terminal: a metal having aluminum as a main component
   Plate portion: rectangular
   Flange portion: rectangular parallelopiped (refer to FIG. 4)
     Length in X direction: ½ of length (long side) of plate portion in a lengthwise direction
     Length in Y direction: ⅕ of length (short side) of plate portion in a transverse direction
     Length in Z direction: two times length (thickness) of plate portion in a thickness direction
Internal terminal joining portion: the internal terminal and the external terminal are joined to each other by swaging With respect to the external terminal, when a load (stress of 10 MPa) in an opposite direction to the external terminal in the height direction Z was applied to the external device joining portion, an amount of deformation of the internal terminal caused by the load was 0.021 mm. The amount of deformation was smaller than an amount of deformation (0.049 mm) in a case where a flange portion is not provided on the external terminal and, accordingly, it was confirmed that the external terminal according to the present embodiment is capable of suppressing a decline in a joining force between the internal terminal and the external terminal.

Assembled Battery

Figure 6:
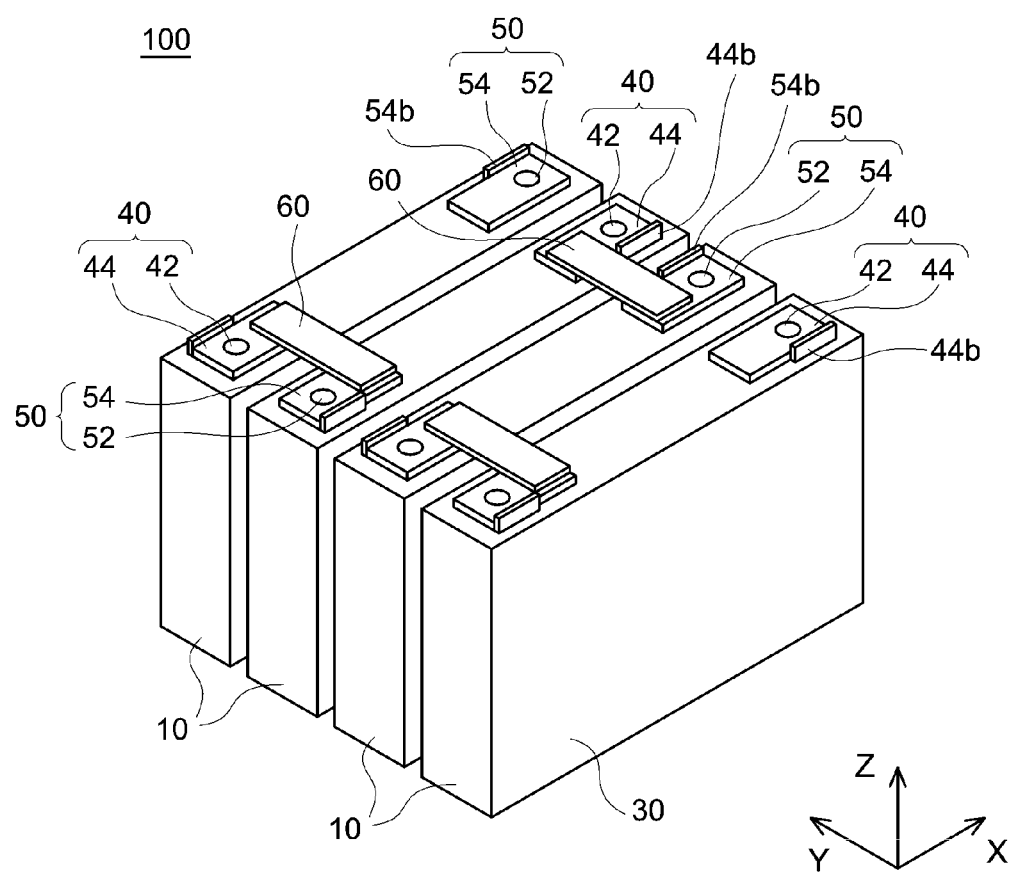
FIG. 6 is a perspective view schematically showing an assembled battery according to an embodiment of the present disclosure.

The sealed battery 10 according to the present embodiment can be used as a unit cell 10 in an assembled battery 100 such as that shown in FIG. 6. In other words, the unit cell 10 according to the present embodiment includes an electrode body (refer to FIG. 1) including a positive electrode and a negative electrode and a battery case 30 which houses the electrode body. A positive electrode-side electrode terminal (a positive electrode terminal 40) and a negative electrode-side electrode terminal (a negative electrode terminal 50) are attached to the battery case 30.

The positive electrode terminal 40 includes a positive electrode internal terminal 42 which is connected to a positive electrode of the electrode body inside the battery case 30 and of which a part is exposed to the outside of the battery case 30 and a positive electrode external terminal 44 which is connected outside of the battery case 30 to the positive electrode internal terminal 42. In a similar manner, the negative electrode terminal 50 includes a negative electrode internal terminal 52 which is connected to a negative electrode of the electrode body inside the battery case 30 and of which a part is exposed to the outside of the battery case 30 and a negative electrode external terminal 54 which is connected outside of the battery case 30 to the negative electrode internal terminal 52. In addition, insulated holders (refer to FIG. 1) are arranged between the battery case 30 and the external terminals 44 and 54.

At least one of the positive electrode external terminal 44 and the negative electrode external terminal 54 includes plate portions 44a and 54a and flange portions 44b and 54b. The plate portions 44a and 54a (refer to FIGS. 3 and 4) have a rectangular shape and include an internal terminal joining portion 54a1 (refer to FIG. 2) that is joined to the internal terminals 42 and 52 at one end of the plate portions 44a and 54a in a lengthwise direction and an external device joining portion 54a2 (refer to FIG. 2) that is joined to an external device at another end of the plate portions 44a and 54a in the lengthwise direction. The flange portions 44b and 54b are arranged in at least one side edge portion of the plate portions 44a and 54a in a transverse direction so as to rise approximately perpendicularly with respect to the plate portions 44a and 54a, and a first imaginary line which passes through a nearest point of the internal terminal joining portion 54a1 to the external device joining portion 54a2 and which is parallel to the transverse direction of the plate portions 44a and 54a intersects with the flange portions 44b and 54b.

In the assembled battery 100 according to the present embodiment, the positive electrode internal terminal 42 and the positive electrode external terminal 44 are constituted of the same type of metal materials (for example, aluminum). In addition, the negative electrode internal terminal 52 and the negative electrode external terminal 54 are also constituted of the same type of metal materials (for example, copper).

The assembled battery 100 includes, between two unit cells 10 arranged adjacent to each other, a busbar 60 which connects an external device joining portion of the positive electrode external terminal 44 of one unit cell 10 and an external device joining portion of the negative electrode external terminal 54 of the other unit cell 10 to each other. Specifically, between two adjacent unit cells 10, respective unit cells 10 are arranged by alternating orientations thereof so that the positive electrode terminal 40 of one unit cell 10 and the negative electrode terminal 50 of the other unit cell 10 come close to each other. In addition, between the adjacent unit cells 10, the external device joining portion of the positive electrode external terminal 44 of one unit cell 10 and the external device joining portion of the negative electrode external terminal 54 of the other unit cell 10 are connected to each other by the busbar 60. Accordingly, a conductive path from the positive electrode internal terminal 42 of one unit cell 10 to the negative electrode internal terminal 52 of the other unit cell 10 is formed via the busbar 60 and the external terminals, and the respective unit cells 10 are electrically connected in series.

Even in such an assembled battery, a decline in a joining force between the internal terminal and the external terminal can be suppressed.

While specific examples of the present disclosure have been described in detail, such specific examples are merely illustrative and are not intended to limit the scope of claims. Techniques described in the scope of claims include various modifications and changes made to the specific examples illustrated above.

What is claimed is:

1. A sealed battery, comprising:
an electrode body including a positive electrode and a negative electrode;
a battery case housing the electrode body;
internal terminals which are individually connected to the positive electrode or the negative electrode of the electrode body housed in the battery case, and are partially exposed to outside of the battery case; and
external terminals which are connected to the respective internal terminals outside the battery case, wherein
at least one of the external terminals electrically connected to the positive electrode and the external terminals electrically connected to the negative electrode includes a plate portion and a flange portion,
the plate portion has a rectangular shape, and
the plate portion includes
an internal terminal joining portion formed at one end of the plate portion in a lengthwise direction, that is joined to a corresponding internal terminal, and
an external device joining portion formed at another end of the plate portion in the lengthwise direction, that is joined to an external device,
the flange portion is connected to at least one side edge portion of the plate portion in a transverse direction,
the flange portion rises approximately perpendicularly with respect to the plate portion,
a first imaginary line which passes through a nearest point of the internal terminal joining portion to the external device joining portion and which is parallel to the transverse direction of the plate portion intersects with the flange portion,
a second imaginary line which passes through a farthest point of the internal terminal joining portion to the external device joining portion and which is parallel to the transverse direction of the plate portion intersects with the flange portion,
the flange portion continuously exists between a first intersection of the first imaginary line and the flange portion and a second intersection of the second imaginary line and the flange portion, and
the flange portion is connected to both side edge portions of the plate portion in the transverse direction.

2. The sealed battery according to claim 1, wherein each of the external terminals has a flat plate shape.

3. The sealed battery according to claim 1, wherein on at least one of the positive electrode side and the negative electrode side, a corresponding internal terminal of the internal terminals and a corresponding external terminal of the external terminals are constituted of different types of metal materials.

4. The sealed battery according to claim 3, wherein one of the internal terminals is constituted of a metal material of which a main component is copper, and the corresponding external terminal is constituted of a metal material of which a main component is aluminum.

5. The sealed battery according to any one of claim 1, wherein
each of the internal terminals includes a shaft portion which penetrates a corresponding external terminal of the external terminals and which is exposed to the outside of the battery case, and
a swaged portion that has been swaged so as to extend along an outer surface of the corresponding external terminal is formed at an end of the shaft portion on an exterior side of the battery case, and the internal terminal joining portion is formed along an outer peripheral edge portion of the swaged portion.

* * * * *